United States Patent [19]

Herman et al.

[11] 4,161,357

[45] Jul. 17, 1979

[54] PHOTORECEPTOR HEATING APPARATUS

[75] Inventors: John L. Herman, Penfield; John Stavisky, Fairport, both of N.Y.

[73] Assignee: Xerox Corporation, Stamford, Conn.

[21] Appl. No.: 830,258

[22] Filed: Sep. 2, 1977

[51] Int. Cl.[2] .................... G03G 15/00; G03B 27/52

[52] U.S. Cl. .................... 355/3 DR; 219/216; 339/5 R; 339/5 P; 355/30

[58] Field of Search .................... 355/3 DR, 3 R, 14, 30; 219/216, 469–471; 339/5 R, 5 M, 5 P

[56] References Cited

U.S. PATENT DOCUMENTS

| | | | |
|---|---|---|---|
| 2,357,809 | 9/1944 | Carlson | 355/3 R |
| 2,577,243 | 12/1951 | Günther | 219/471 |
| 3,136,590 | 6/1964 | Manson | 339/5 P |
| 3,217,137 | 11/1965 | Weitzner | 219/470 X |

*Primary Examiner*—R. L. Moses

*Attorney, Agent, or Firm*—William A. Henry II

[57] ABSTRACT

A system for controlling temperature excursions of the photoreceptor in a copying machine includes a slip ring assembly that provides power to a heater located inside the photoreceptor and connected to the surface of the photoreceptor. This arrangement allows the photoreceptor temperature to be controlled at a constant value.

4 Claims, 2 Drawing Figures

PHOTORECEPTOR HEATING APPARATUS

BACKGROUND OF THE INVENTION

The present invention relates to apparatus for heating copier photoreceptors and more particularly, to an apparatus for transmitting power from a power source to a heater located within a copier.

Some photoconductive members in electrostatographic machines in the past have been affected by environmental temperatures to such an extent that at times of low temperature, surface potential of photoreceptors becomes high, and in the event that an electrostatic latent image is formed on the surface of the photoconductive members by a process of electrophotography, contrast between a region of an electrostatic latent image and regions other that the first mentioned region normally referred to as background becomes low, thus causing copies of less than desired quality to be produced. Temperature excursions of photoconductive members result in voltage variations which cause copy (density background) variations.

PRIOR ART STATEMENT

Various way have been suggested toward correcting this problem, e.g., Carlson in U.S. Pat. No. 2,357,809 disclosed that humidity conditions can be controlled by locating a heater within the shell of the drum against which the metal sheet carrying the photoconductive layer is held. In U.S. Pat. No. 3,887,367, Delmar Parker shows that improved development can be obtained from selenium-arsenic photoreceptors by raising and maintaining the temperature of the photoreceptors at a point within the range of about 10% to 30% above controlled ambient conditions. I.B.M. Technical Disclosure Bulletin Volume 19, Number 2, July of 1976 suggests that by heating the environment of the photoconductor relative humidity is reduced, thereby reducing lateral conductivity due to corona caused salts. The heretofore mentioned patents and Technical Disclosure Bulletin are incorporated herein by reference.

In the above-mentioned solutions, it is necessary to supply energy to the photoconductor member which could be a rotating drum. However, generally the photoconductor drum in the electrostatographic copier is a part, which is removed quite often, and therefore, a need has been shown for an energizing mechanism, which can easily and safely be handled by a machine operator and which requires lesser steps of operation when the drum is installed or removed from the copier. For example, H. G. Manson in U.S. Pat. No. 3,136,590 shows a collector-ring assembly adapted for transferring electric power between objects which are rotating relative to one another, but to use this assembly on the end of a photoreceptor mounting shaft would usually require threading wires through the shaft to a heater located inside the photoreceptor. This is a time consuming and relatively unsafe procedure. Elimination of the step of threading wires through the photoreceptor mounting shaft is necessary for an improved power transmission system.

One apparatus for eliminating the aforementioned step of threading wires through the photoreceptor mounting shaft is disclosed in Japanese Patent application No. 50-152,544 filed in Japan on Nov. 11, 1975. Disclosed therein is a drum fastening device that incorporates an energizing mechanism. The present invention improves upon this apparatus and other heretofore mentioned photoreceptor stabilizing methods.

OBJECTS OF THE INVENTION

Accordingly, an object of the present invention is to provide a power transmission means that can easily and safely be installed into as well as removed from a copier.

A still further object of the present invention is to provide a power transmission means that requires fewer steps of operation at the time of installation or removing a photoreceptor.

SUMMARY OF THE INVENTION

These and other objects of the present invention are obtained by employing a slip ring assembly adjacent the photoreceptor with the slip rings supplying power to a heater positioned inside the photoreceptor and connected to the surface of the photoreceptor such that control of the temperature on the photoreceptor surface is maintained.

BRIEF DESCRIPTION OF THE DRAWINGS

For a better understanding of the invention as well as other objects and further features thereof, reference is had to the following detailed description of the invention to be used in conjunction with the accompanying drawings, wherein.

DESCRIPTION OF THE PREFERRED EMBODIMENT

The present invention can be used in any device that requires the transmission of power from one area to another. However, for the purpose of exemplary disclosure the invention will be described within the environment of a xerographic reproduction apparatus. An example of such a xerographic reproduction apparatus is shown in U.S. Pat. No. 3,775,008 in the name of R. A. Schaeffer and is incorporated herein by reference.

The photoreceptor drum is the heart of the xerographic copier. As each copy is reproduced, a bar of light scans the original document, and then transmits its reflective image through lenses to a revolving selenium coated drum which has been statically charged. Because of the conductivity of the drum, the light discharges the electrical charges, leaving a latent image identical to that on the document. The drum then rotates through a chamber of powdered ink which coats the charged areas. A sheet of paper is then precisely applied over the image. The image is then transferred electrically to the paper. After transfer, the paper is stripped from the drum and passed through a fuser which fixes the image to the paper. To accomplish this, the drum must be (A) discharged, (B) cleaned, (C) charged (D) exposed, (E) developed, (F) covered with paper and (G) stripped of the paper and image for each copy made. To achieve and maintain reliably good copy quality, temperature excursions of the selenium coated drum surface must be controlled.

Figure 1:
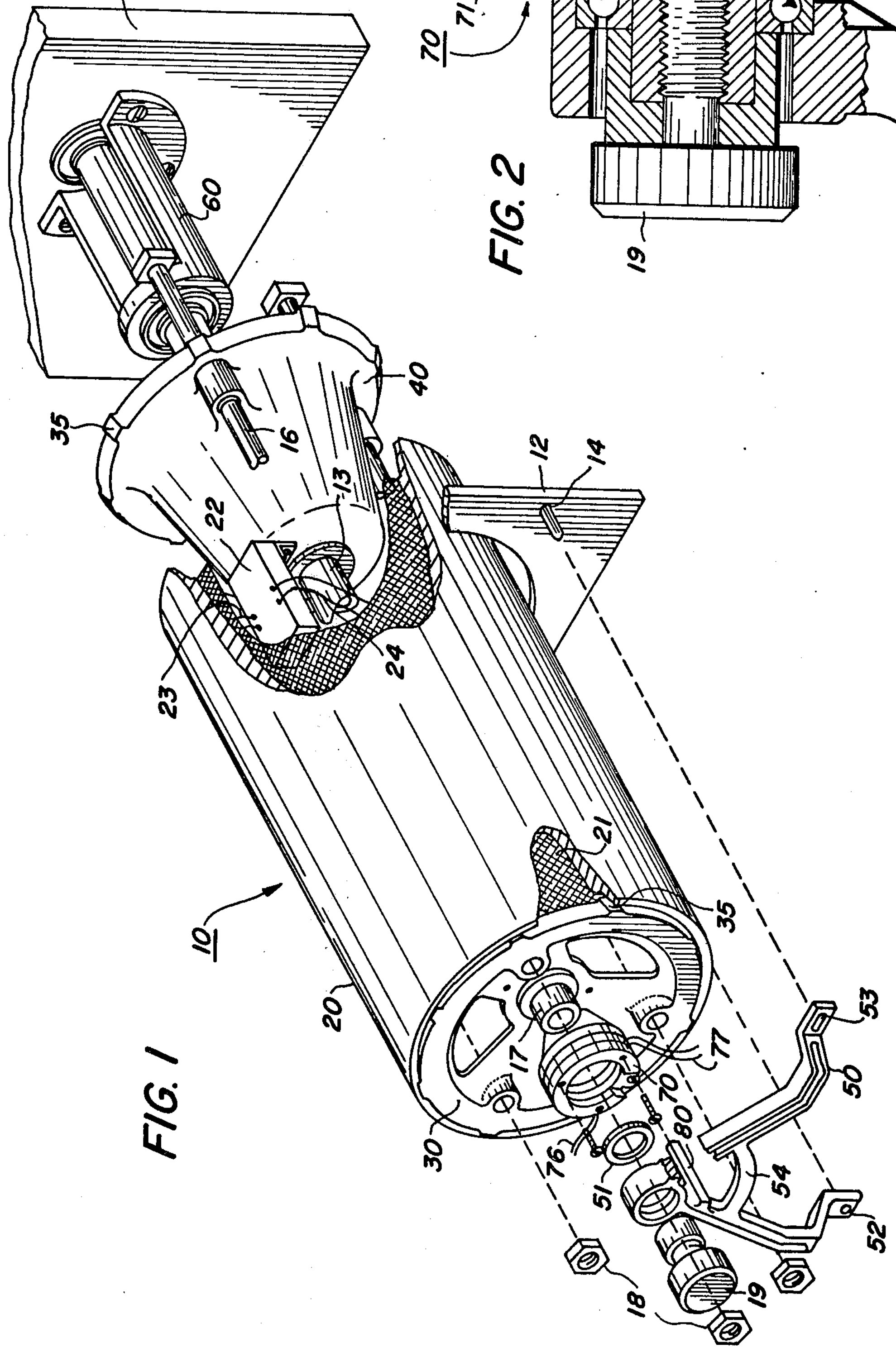
FIG. 1 is an exploded partial schematic of an apparatus incorporating the present invention.

In reference to FIG. 1, the present invention is shown incorporated into a production machine similar to the Xerox 4000. As is shown in FIG. 1, a frame with a front panel 12 and a rear panel 11 for a reproduction machine support has a shaft 13 that is cantileverly mounted to the frame. Concaved endbells 30 and 40 are shown being supported on the shaft with the rear or inboard endbell 40 having a pronounced cavity thereon that fits over bearing 60. Means are located on the surface of the outboard and inboard endbells immediately adjacent the inner surface of the drum for reducing the contact area where interface fit between the hub and the drum occurs in order to diminish photoreceptor drum runout. A photosensitive member 20 is shown as being placeable over the inboard endbell or hub 40 and the front or outboard endbell 30 is shown as being adaptable to close the open end of the drum. Tie rods 16 extend through openings in the inboard hub or endbell 40 through the interior of the drum and through complementary openings in the outboard hub and have threads thereon that allow nuts 18 to tighten the inboard and outboard endbells to the drum. A slip ring assembly or power transmission ring means 70 is shown adapted for placement over shaft 13 and adjacent endbell 30. A two-pronged support 50 is also shown adjacent to the outboard hub and is used to stabilize the cantilevered shaft 13 once the drum is placed thereon. End cap 19 connects rotation of the support shaft to the drum through bearing 17.

Figure 2:
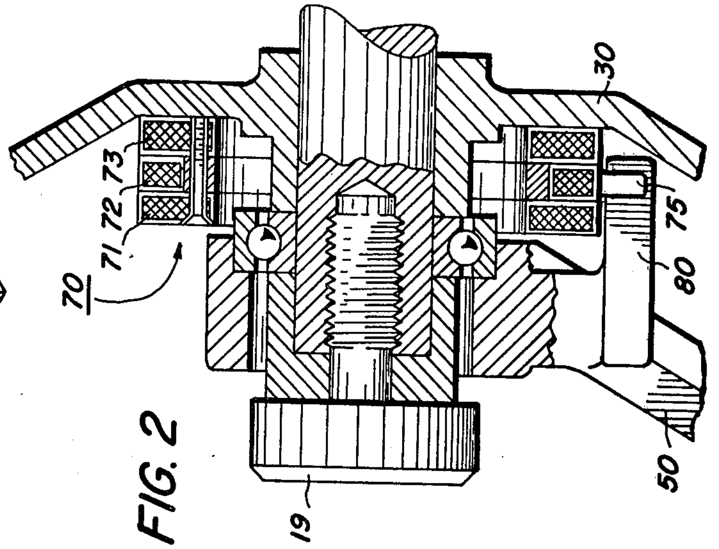
FIG. 2 is an assembled partial cross-section of the apparatus in FIG. 1.

It is within the area of the slip ring or power transmission means that the present invention resides. Power transmission means 70 is conventional and can be constructed similar to the collector-ring assembly disclosed in U.S. Pat. No. 3,136,590 to H. G. Manson which is incorporated herein by reference. Slip ring assembly 70 transmits electrical energy from an outlet through lead wires 76 through the assembly and on to lead wires 77 and subsequently to a conventional heater/controller 22 that is available from Fawn Plastics Company, of Timonium, Maryland. Energy as needed is provided to heat blanket 21 located on the interior surface of photoreceptor 20 through lead wires 23 and 24 of controller means 22. The slip ring assembly 70 comprises three concentric annular members that are adapted to fit over shaft 13. The two outer members 71 and 73 rotate as the shaft and drum rotate, however, member 72 is held stationary by the mating of lip 75 with element 80 that extends from support means 50 as shown in FIG. 2. A slip ring assembly as shown in FIG. 1 eliminates the need for threading wires through the photoreceptor support shaft and therefore makes for a more efficient photoreceptor replacement procedure.

The employment of a slip ring 70 according to the present invention reduces the time needed for assembly and disassembly of a photoreceptor onto a copier drum shaft and also increases safety from the standpoint of increasing accessibility to lead wires that connect to the heater/ controller located on the interior hub 40. The drum 20 may be installed or removed merely by removing the power supply connector 76 in addition to removal of the two-pronged support.

Two-pronged support 50 is releasably mounted on capless pins 14 that are tapered for ease of attachment and detachment of the support to the exterior of front frame panel 12. The support is in the form of a removable support bracket with two substantially spaced arms at approximately 90° and a central ball bearing shaft support member 51 of the outboard end of the drum shaft. The arms are arcuate in shape to allow connection bearing 17 to be recessed in relation to a vertical plane at the outboard end of the drum. The crossbrace 54 is located intermediately of the arms to provide reinforcement for the support bracket. The support bracket has apertures 52 and 53 with aperture 53 being elongated to allow for manufacturing error in placing pins 14 on the front frame. The bracket 50 in addition to the cantilevered support of the drum supporting shaft 13 gives three point support to the shaft.

As can be seen from the above detailed description, the apparatus of the present invention controls the temperature on the surface of the photoreceptor by employing a slip ring assembly adjacent the photoreceptor with the slip ring supplying power to a heater positioned inside the photoreceptor and connected to the photoreceptor surface. This arrangement makes for ease in installation as well as removal of photoreceptors and also increases safety in handling the heater/controller and slip ring assembly due to the accessibility of lead wires.

In addition to the apparatus outlined above, many other modifications and/or additions to this invention will be readily apparent to those skilled in the art upon reading this disclosure, and these are intended to be encompassed within the invention disclosed and claimed herein.

In the claims:

1. A copier having a substantially cylindrical photoreceptor, a shaft journaled to said copier, endbells adapted for mounting said photoreceptor to said shaft, said photoreceptor including energy receptor means on a first surface thereof, and heater/controller means adapted for connection to said energy receptor means for controlling temperature variations of a second surface of the photoreceptor, the improvement comprising:

power transmission means adapted to be mounted over said shaft, said power transmission means including a slip ring assembly that comprises three concentric annular members, one of said members being stationary, and support means adapted to fit over said shaft and against said power transmission means wherein said one of said annular members has projection means thereon for mating with said support means and preventing said one of said annular members from rotating relative to said shaft.

2. The improvement of claim 1 including first wire means for connecting one of said annular members to a power source and second wire means for connecting one of said annular members to said heater/controller.

3. The improvement of claim 2 including means for providing sliding electrical contact between a first one of said annular members and a second one of said annular members.

4. The improvement of claim 3 wherein said heater/-controller is ON at all times except when the copier is in a run cycle.

* * * * *